United States Patent
Goller et al.

(10) Patent No.: US 8,227,930 B2
(45) Date of Patent: Jul. 24, 2012

(54) SYSTEM AND METHOD FOR ADJUSTING A BENDING MOMENT OF A SHAFT IN A WIND TURBINE

(75) Inventors: George Albert Goller, Greenville, SC (US); Dale Robert Mashtare, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,796

(22) Filed: Aug. 25, 2011

(65) Prior Publication Data

US 2012/0139242 A1  Jun. 7, 2012

(51) Int. Cl.
*F03D 9/00* (2006.01)
*H02P 9/04* (2006.01)
*G01C 9/00* (2006.01)
*G01C 17/00* (2006.01)
*G01C 19/00* (2006.01)

(52) U.S. Cl. ............ 290/44; 290/55; 702/150; 702/151; 416/1

(58) Field of Classification Search ............... 290/44, 290/55; 702/150, 151; 416/1
See application file for complete search history.

(56) References Cited

U.S. PATENT DOCUMENTS

| | | | |
|---|---|---|---|
| 4,193,005 A | 3/1980 | Kos et al. | 290/44 |
| 5,140,856 A * | 8/1992 | Larsen | 73/455 |
| 6,361,275 B1 | 3/2002 | Wobben | 416/33 |
| 6,619,918 B1 | 9/2003 | Rebsdorf | 416/1 |
| 6,879,055 B2 * | 4/2005 | Becker et al. | 290/55 |
| 7,004,724 B2 | 2/2006 | Pierce et al. | 416/61 |
| 7,095,129 B2 * | 8/2006 | Moroz | 290/44 |
| 7,160,083 B2 | 1/2007 | Pierce et al. | 416/61 |
| 7,243,557 B2 | 7/2007 | May | 73/862.333 |
| 7,322,794 B2 * | 1/2008 | LeMieux et al. | 416/40 |
| 7,437,264 B2 * | 10/2008 | Pierce et al. | 702/151 |
| 7,547,985 B2 | 6/2009 | Takaichi et al. | 290/55 |
| 7,621,843 B2 * | 11/2009 | Madge et al. | 475/346 |
| 7,631,564 B1 | 12/2009 | Sihler et al. | 73/862.333 |
| 7,685,891 B2 | 3/2010 | May | 73/862.333 |
| 7,755,210 B2 | 7/2010 | Krammer et al. | 290/44 |
| 7,759,815 B2 * | 7/2010 | Christensen | 290/55 |
| 7,772,713 B2 | 8/2010 | Huang et al. | 290/44 |
| 7,855,469 B2 * | 12/2010 | Stegemann et al. | 290/55 |
| 7,874,797 B2 * | 1/2011 | Pierce et al. | 416/1 |
| 7,880,321 B2 | 2/2011 | Arinaga et al. | 290/44 |
| 7,891,944 B2 | 2/2011 | Jeppesen et al. | 416/1 |
| 7,944,079 B1 * | 5/2011 | Signore et al. | 290/55 |
| 8,092,171 B2 * | 1/2012 | Wiebrock et al. | 416/1 |
| 8,099,255 B2 * | 1/2012 | Madge | 702/150 |
| 2003/0080566 A1 * | 5/2003 | Becker et al. | 290/55 |
| 2004/0151575 A1 * | 8/2004 | Pierce et al. | 415/1 |
| 2008/0147280 A1 * | 6/2008 | Breed | 701/46 |

(Continued)

FOREIGN PATENT DOCUMENTS

DE  19731918 B4  12/2005

(Continued)

*Primary Examiner* — Pedro J Cuevas
(74) *Attorney, Agent, or Firm* — Dority & Manning, P.A.

(57) ABSTRACT

A system and method for adjusting a bending moment of a shaft in a wind turbine are disclosed. The system includes a pillow block accepting the shaft therethrough, a sensor mounted to the pillow block and measuring deformation of the pillow block, and a control system communicatively coupled to the sensor. The control system is configured to adjust a rotor blade in response to the deformation of the pillow block. The method includes measuring a deformation of a pillow block, and adjusting a rotor blade in response to the deformation of the pillow block. The pillow block accepts the shaft therethrough.

20 Claims, 4 Drawing Sheets

U.S. PATENT DOCUMENTS

| | | | |
|---|---|---|---|
| 2009/0261594 A1* | 10/2009 | Christensen | 290/55 |
| 2010/0133828 A1* | 6/2010 | Stegemann et al. | 290/44 |
| 2010/0286950 A1* | 11/2010 | Heijkants et al. | 702/151 |
| 2011/0150649 A1* | 6/2011 | White et al. | 416/61 |

FOREIGN PATENT DOCUMENTS

| | | |
|---|---|---|
| EP | 0998634 B1 | 11/2003 |
| EP | 1243790 | 5/2005 |
| NO | 323071 | 12/2006 |

\* cited by examiner

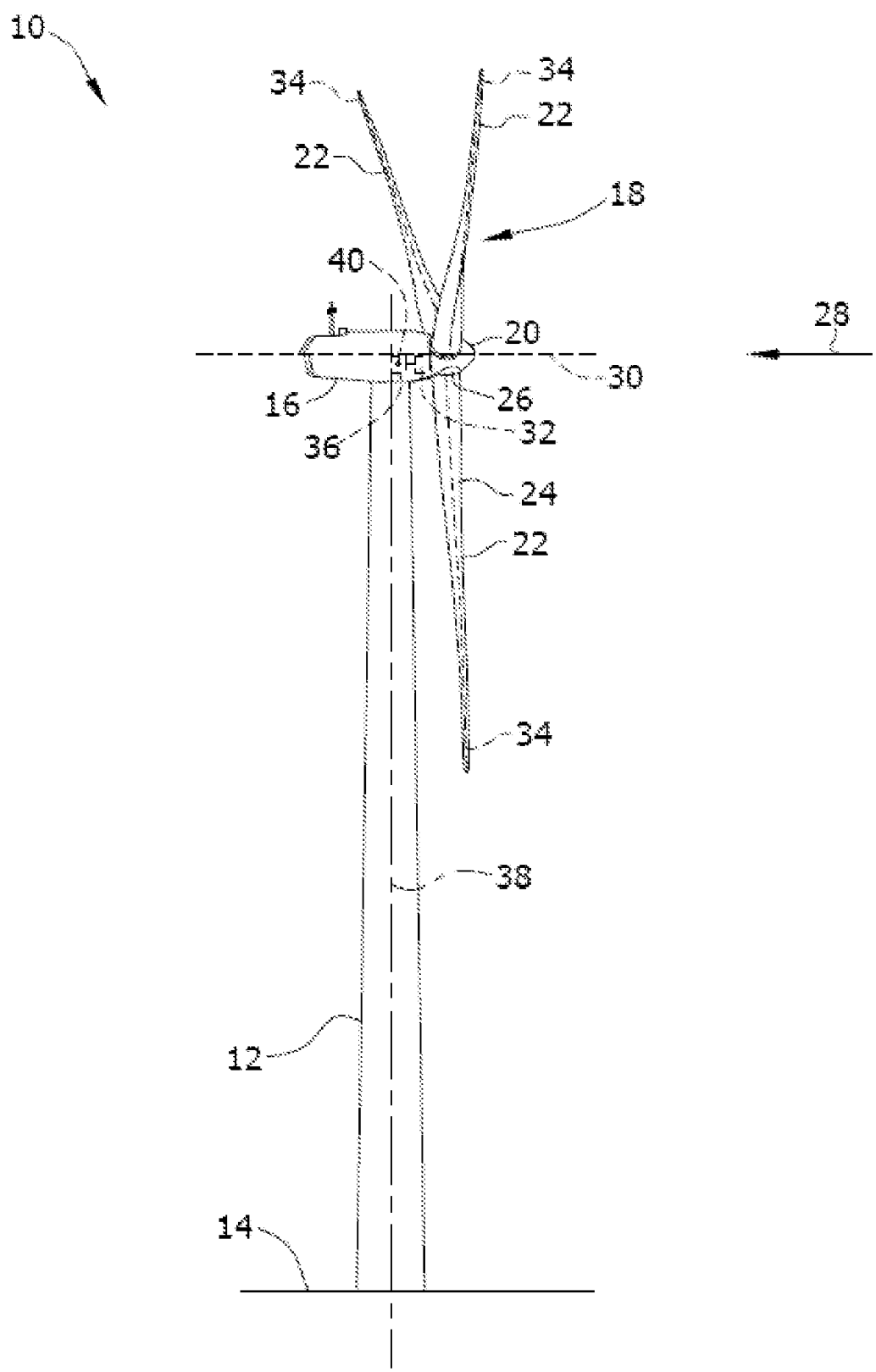
FIG. -1-

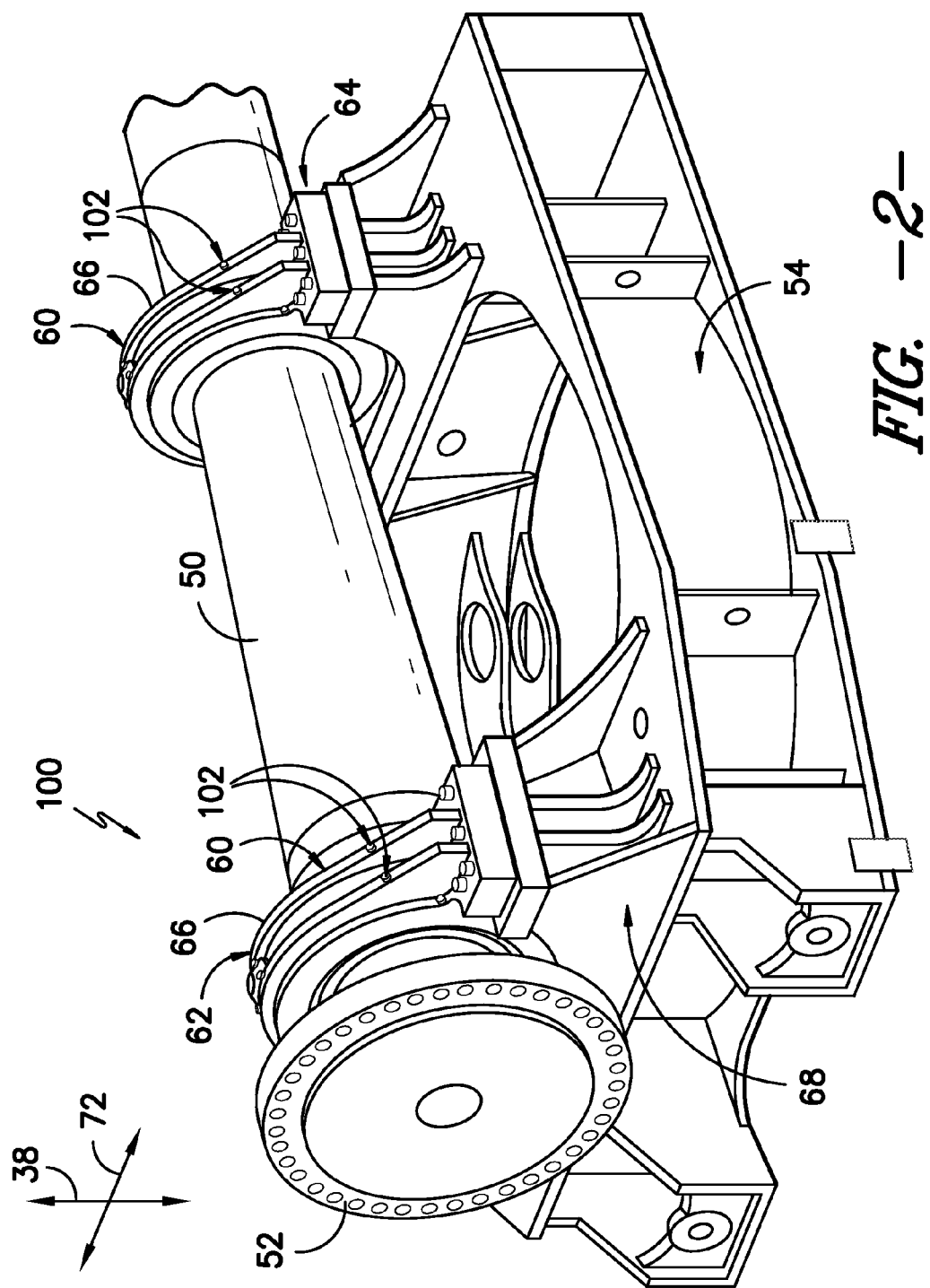
FIG. -2-

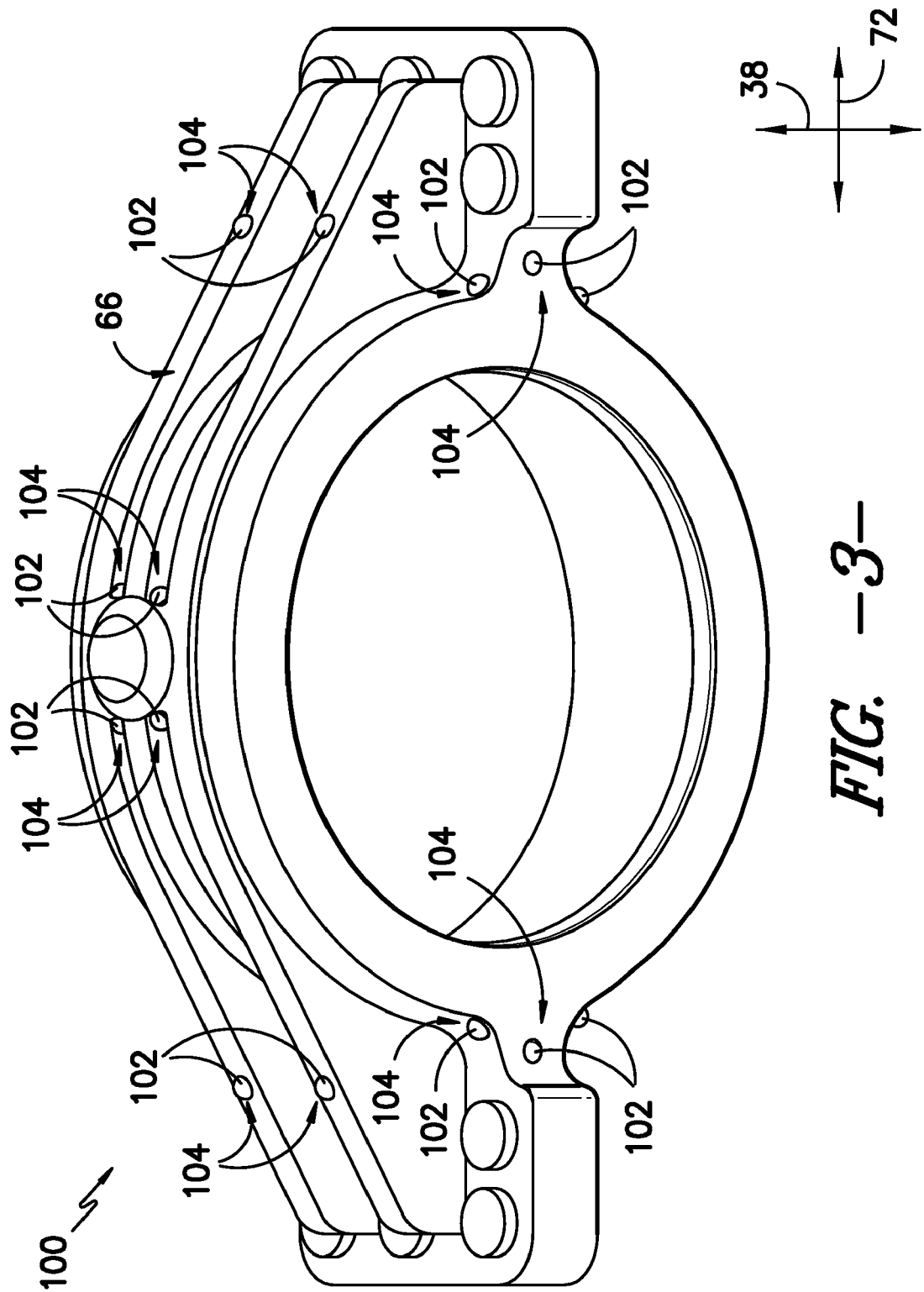
FIG. -3-

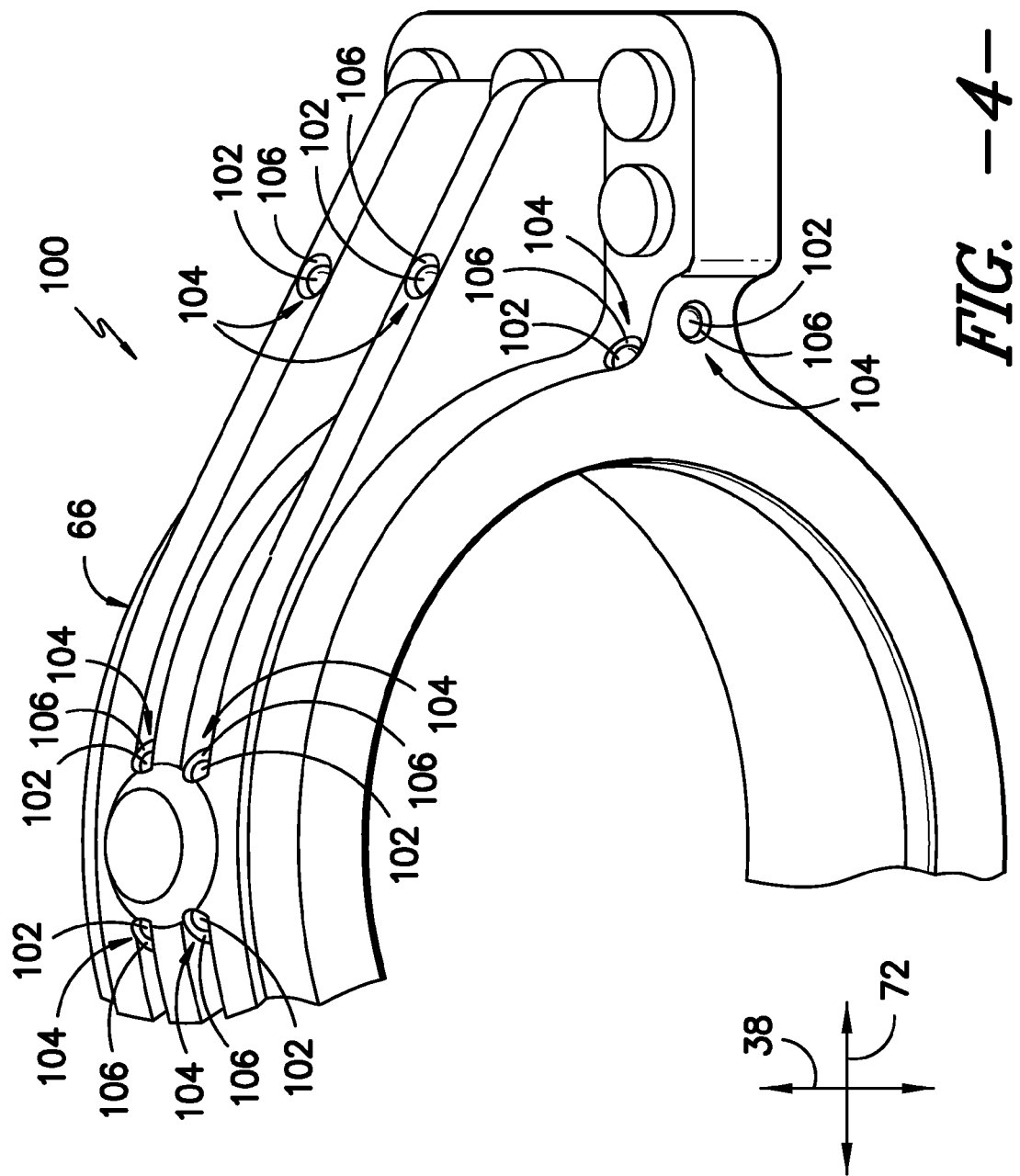
FIG. -4-

SYSTEM AND METHOD FOR ADJUSTING A BENDING MOMENT OF A SHAFT IN A WIND TURBINE

FIELD OF THE INVENTION

The subject matter disclosed herein relates generally to wind turbines, and more particularly to systems and methods for adjusting the bending moment of a shaft in a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads. In particular, the shaft coupling the rotor blades and the generator may be subjected to various loads, such as axial and bending loads. Deflection of the shaft due to these loads may thus frequently occur during operation of the wind turbine. The bending moment induced on the shaft due to such loading is a particularly critical variable, and in many cases should desirably be reduced during operation of the wind turbine.

However, currently known systems and methods for measuring shaft deflection, such as bending moment, may not be accurate and/or may be poorly located. For example, proximity probes may be mounted to a flange on the shaft to monitor displacement. However, such probes must be located in relatively small, inaccessible areas, making them difficult to install and maintain. This can result in inaccuracy and poor reliability. Another example involves sensors mounted to the shaft itself. However, such mounting requires relatively expensive and unreliable telemetry systems for obtaining and transmitting data. Further, currently know systems and methods can result in confounding of various types of deflection, such as torsional moment versus bending moment.

Thus, an improved system and method for adjusting the bending moment of a shaft in a wind turbine is desired. For example, a system and method that provide more accurate and reliable measurements and adjustments would be advantageous.

BRIEF DESCRIPTION OF THE INVENTION

Aspects and advantages of the invention will be set forth in part in the following description, or may be obvious from the description, or may be learned through practice of the invention.

In one embodiment, a system for adjusting a bending moment of a shaft in a wind turbine is disclosed. The system includes a pillow block accepting the shaft therethrough, a sensor mounted to the pillow block and measuring deformation of the pillow block, and a control system communicatively coupled to the sensor. The control system is configured to adjust a rotor blade in response to the deformation of the pillow block.

In another embodiment, a method for adjusting a bending moment of a shaft in a wind turbine is disclosed. The method includes measuring a deformation of a pillow block, and adjusting a rotor blade in response to the deformation of the pillow block. The pillow block accepts the shaft therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a perspective view of a system according to one embodiment of the present disclosure;

FIG. 3 is a perspective view of a system including a plurality of sensors mounted to a pillow block according to one embodiment of the present disclosure; and, FIG. 4 is a partial perspective view of a system including a plurality of sensors mounted to a pillow block according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch angle adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch angle adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

FIG. 2 illustrates one embodiment of a shaft 50 according to the present disclosure. The shaft 50 includes a hub flange 52 for mounting the hub thereon. The shaft 50 further extends into the nacelle 16 and is operably connected to a generator (not shown). The shaft 50 in some embodiments may be a direct-drive shaft 50. In these embodiments, the shaft 50 is directly connected to the generator. Alternatively, a gearbox (not shown) may be disposed between the shaft 50 and the generator, and may provide the operable connection between the shaft 50 and the generator. Rotation of the rotor blades 22 is transmitted through the hub 20 to the shaft 50, and from the shaft 50 to the generator.

A bed plate 54 may be provided to support the shaft 50, as shown. In general, the bed plate 54 is a frame disposed in the nacelle 16. The bed plate 54 may, in some embodiments, further provide support for other components of the wind turbine 10, such as the generator and/or, if present, the gearbox.

As shown in FIG. 2, the bed plate 54 according to the present disclosure may include a pillow block assembly 60, or a plurality of pillow block assemblies 60, thereon for accommodating and supporting the shaft 50. In one embodiment as shown in FIG. 2, the bed plate 54 includes a forward pillow block assembly 62 and an aft pillow block assembly 64. The forward pillow block assembly 62 is the pillow block assembly adjacent the hub 20, and the aft pillow block assembly 64 is the pillow block assembly distal from the hub 20. It should be understood, however, that the present disclosure is not limited to a forward pillow block assembly 62 and an aft pillow block assembly 64. Rather, any number or form of pillow blocks assemblies 60 is within the scope and spirit of the present disclosure.

Each of the pillow block assemblies 60 may include, for example, a pillow block 66 and, optionally, a pedestal 68. The pillow block 66 may accept the shaft 50 therethrough and interact with the shaft 50. For example, the pillow block 66 may include a bearing, such as a locating bearing or a floating bearing, therein for supporting the shaft 50. The pedestal 68 may support the pillow block 66 and align the pillow block 66 with the shaft 50. The various components of the pillow block assembly 60 may be separate elements from the bed plate 54, or may integral with the bed plate 54.

During operation of the wind turbine 10, the shaft 20 may be subjected to various loads, such as axial loads and bending loads, as shown in FIG. 2. Various of these loads may cause the shaft 50 to be subjected to a bending moment. The bending moment may occur in any suitable direction. For example, the bending moment may occur about the yaw axis 38 or about a tilt axis 72. Such bending moment may not translate into useful mechanical energy, and may rather have detrimental effects on other various components of the wind turbine 10, such as the drivetrain. Therefore, this bending moment must be accurately measured to, for example, allow it to be accurately utilized as an input to adjust other components of the wind turbine 10 in order to reduce the bending moment. Such improved control input capability may reduce loading on various components of the wind turbine 10 and ensure better performance of the wind turbine 10.

Thus, as shown in FIGS. 2 through 4, a system 100 is disclosed for adjusting a bending moment of the shaft 50. The present inventors have discovered that, by mounting sensors to a pillow block 66 and measuring deformation of the pillow block 66, such measurements can be accurately correlated to a bending moment of the shaft 50. This advantageously allows for accurate, reliable, and inexpensive measurement and adjustment of such bending moments, which allows for reductions in the bending moments and resulting better performance of the wind turbine 10.

The system 100 includes a pillow block 66 and at least one sensor 102 mounted to the pillow block 66. For example, a sensor 102 may be adhered to the pillow block 66 with a suitable adhesive, or welded or otherwise adhered to the pillow block 66, or may be mounted using a suitable mechanical fastener such as a nut and bolt combination, nail, screw, rivet, bracket, or other suitable mechanical fastener, or may be mounted using any other suitable mounting device or method. Each sensor 102 measures deformation of the pillow block 66. For example, in some embodiments as shown, a sensor 102 may be a strain gauge. Additionally or alternatively, the sensor 102 may measure the strain of the pillow block 66. In other embodiments, a sensor 102 may be any suitable sensor or gauge that can measure any suitable deformation, such as measure any suitable change in the shape, size or other physical property of the pillow block 66 due to applied forces or other stress resultant from the bending moments or otherwise of the shaft 50.

Further, a sensor 102 according to the present disclosure may measure deformation in only one direction, or in multiple directions. For example, in some embodiments, a sensor 102 may only measure deformation due to bending of the shaft 50 about the yaw axis 38. In other embodiments, a sensor 102 may only measure deformation due to bending of the shaft 50 about the tilt axis 72. In still other embodiments, a sensor 102 may measure deformation due to bending of the shaft 50 about both the yaw axis 38 and the tilt axis 72 and/or may measure deformation due to bending of the shaft 50 in or about any suitable direction or axis.

In some embodiments, a sensor 102 mounted to a pillow block 66 may be located at a maximum deformation location 104. A maximum deformation location 104 is a location on the pillow block 66 that is subjected to relatively higher deformation that surrounding locations on the pillow block 66 due to bending of the shaft 50 in at least one direction or about at least one axis. Maximum deformation locations 104 may be determined for a specific pillow block 66 during design or testing of the pillow block 66 or during operation of the pillow block 66. Further, in some embodiments, the sensor 102 may be located in a region with a reduced gradient of deformation. This may allow for repeatable and predictable measurements.

In some embodiments, as shown in FIG. 4, a pillow block 66 may define at least one mounting platform 106. A mounting platform 106 may be a surface that is machined into, cast into, or otherwise designed into the pillow block 66, and may thus provide a mounting location for a sensor 102. This may allow for relatively accurate positioning of a sensor 102 on a pillow block 66. A sensor 102 may thus be mounted to the pillow block 66 on the mounting platform 106 as shown.

Further, in some embodiments, a mounting platform 106 may be defined at a maximum deformation location 104. Accurate positioning of a sensor 102 at such maximum deformation location 104 is thus facilitated.

System 100 may further include the control system 36. The control system 36 may be communicatively coupled to the sensor 102. Such communicative coupling may be through a physical coupling, such as through a wire or other conduit or umbilical cord, or may be a wireless coupling, such as through an infra-red, cellular, sonic, optical, or radio frequency based coupling. The control system 36 may further be configured to adjust one or more rotor blades 22 in response to the deformation of the pillow block 50. For example, as discussed above, the control system 36 may adjust the pitch of a rotor blade 22 about pitch axis 34 or the yaw about yaw axis 38. The control system 36 may thus further be configured to make such adjustments in response to the deformation of the pillow block 66. Such adjustments may, in some embodiments, reduce the bending moment of the shaft 50 in at least one direction or about at least one axis.

It should be noted that, in some embodiments, the pillow block 66 may be allowed to deform a pre-determined amount in one or more suitable directions before a rotor blade 22 is adjusted. In these embodiments, the control system 36 adjusts the rotor blades 22 once the pillow block 66 meets or exceeds a certain pre-determined deformation amount or deformation range.

To adjust a rotor blade 22 in response to deformation of the pillow block 60, the control system 36 may include suitable hardware and/or software for correlating the deformation of the pillow block 60 to the bending moment of the shaft 50, as discussed above. Adjustment of a rotor blade 22 may be made in response to the measured deformation and calculated bending moment, such that the bending moment is reduced or otherwise modified as desired or required.

In some embodiments, the control system 36 may be configured to adjust a rotor blade 22 according to a constant feedback loop. Thus, the control system 36 may include suitable software and/or hardware for constantly monitoring and correlating deformation and bending moment in real-time, and for adjusting a rotor blade 22 as required in order for such bending moments to be maintained within a predetermined window or above or below a predetermined minimum or maximum amount.

The present disclosure is further directed to a method for adjusting a bending moment of a shaft 50 in a wind turbine 10. The method may include, for example, the step of measuring a deformation of a pillow block 66, as discussed above. In some embodiments, the measuring step may include measuring deformation due to bending of the shaft 50 about yaw axis 38 and/or about tilt axis 72. The method may further include the step of adjusting a rotor blade 22 in response to the deformation of the pillow block 66, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting a bending moment of a shaft in a wind turbine, the system comprising:
    a pillow block accepting the shaft therethrough;
    a sensor mounted to the pillow block and measuring deformation of the pillow block; and,
    a control system communicatively coupled to the sensor, the control system configured to adjust a rotor blade in response to the deformation of the pillow block.

2. The system of claim 1, further comprising a plurality of sensors.

3. The system of claim 1, wherein the sensor measures deformation due to bending of the shaft about a yaw axis.

4. The system of claim 1, wherein the sensor measures deformation due to bending of the shaft about a tilt axis.

5. The system of claim 1, wherein the sensor is a strain gauge.

6. The system of claim 1, wherein the sensor measures strain of the pillow block.

7. The system of claim 1, wherein the sensor is mounted to the pillow block at a maximum deformation location.

8. The system of claim 1, wherein the pillow block further defines a mounting platform, and wherein the sensor is mounted to the pillow block on the mounting platform.

9. The system of claim 8, wherein the mounting platform is defined in the pillow block at a maximum deformation location.

10. The system of claim 1, wherein the control system is configured to adjust a pitch of the rotor blade in response to the deformation of the pillow block.

11. A wind turbine, comprising:
    a shaft;
    a pillow block accepting the shaft therethrough;

a sensor mounted to the pillow block and measuring deformation of the pillow block; and, a control system communicatively coupled to the sensor, the control system configured to adjust a rotor blade in response to the deformation of the pillow block.

12. The wind turbine of claim 11, wherein the sensor measures strain of the pillow block.

13. The wind turbine of claim 11, wherein the sensor is mounted to the pillow block at a maximum deformation location.

14. The wind turbine of claim 11, wherein the pillow block further defines a mounting platform, and wherein the sensor is mounted to the pillow block on the mounting platform.

15. The wind turbine of claim 11, wherein the control system is configured to adjust a pitch of the rotor blade in response to the deformation of the pillow block.

16. A method for adjusting a bending moment of a shaft in a wind turbine, the method comprising:

measuring a deformation of a pillow block, the pillow block accepting the shaft therethrough; and, adjusting a rotor blade in response to the deformation of the pillow block.

17. The method of claim 16, wherein the measuring step comprises measuring deformation due to bending of the shaft about a yaw axis.

18. The method of claim 16, wherein the measuring step comprises measuring deformation due to bending of the shaft about a tilt axis.

19. The method of claim 16, wherein the deformation is a strain.

20. The method of claim 16, wherein the deformation is measured at a maximum deformation location on the pillow block.

* * * * *